US007673521B2

(12) United States Patent
Ajayan et al.

(10) Patent No.: US 7,673,521 B2
(45) Date of Patent: Mar. 9, 2010

(54) EMBEDDED NANOTUBE ARRAY SENSOR AND METHOD OF MAKING A NANOTUBE POLYMER COMPOSITE

(75) Inventors: Pulickel Ajayan, Troy, NY (US); Emer Lahiff, Troy, NY (US); Paul Stryjek, Troy, NY (US); Chang Y. Ryu, Troy, NY (US); Seamus Curran, Las Cruces, NM (US)

(73) Assignee: Rensselaer Polytechnic Institute, Troy, NY (US)

( * ) Notice: Subject to any disclaimer, the term of this patent is extended or adjusted under 35 U.S.C. 154(b) by 494 days.

(21) Appl. No.: 10/537,944

(22) PCT Filed: Dec. 9, 2003

(86) PCT No.: PCT/US03/38746

§ 371 (c)(1),
(2), (4) Date: Aug. 7, 2006

(87) PCT Pub. No.: WO2004/053464

PCT Pub. Date: Jun. 24, 2004

(65) Prior Publication Data

US 2007/0138010 A1    Jun. 21, 2007

Related U.S. Application Data

(60) Provisional application No. 60/431,834, filed on Dec. 9, 2002.

(51) Int. Cl.
*G01L 1/20* (2006.01)
*G01M 5/00* (2006.01)

(52) U.S. Cl. .................. 73/774; 73/777; 73/775; 73/802; 977/953; 977/956

(58) Field of Classification Search ............ 73/767, 73/768, 774–776, 786, 802, 803; 977/778, 977/953, 956
See application file for complete search history.

(56) References Cited

U.S. PATENT DOCUMENTS

| 4,706,020 A | 11/1987 | Viertl et al. |
| 4,799,010 A | 1/1989 | Muller |
| 5,047,719 A | 9/1991 | Johnson et al. |
| 5,485,084 A | 1/1996 | Duncan et al. |

(Continued)

OTHER PUBLICATIONS

P.M. Ajayan, O. Stephan, C. Colliex, D. Trauth. "Aligned Carbon Nanotube Arrays Formed by Cutting a Polymer Resin-Nanotube Composite." Science. 1212-1214. Aug. 26, 1994.*

(Continued)

*Primary Examiner*—Lisa M Caputo
*Assistant Examiner*—Punam Patel
(74) *Attorney, Agent, or Firm*—Foley & Lardner LLP (57) ABSTRACT

A method of producing polymer/nanotube composites where the density and position of the nanotubes (11) within the composite ca be controlled. Carbon nanotubes (11) are grown from organometallic micropatterns. These periodic nanotube arrays are then incorporated into a polymer matrix (7) by deposing a curable polymer film on the as-grown tubes. This controlled method of producing free-standing nanotube/polymer composite films may be used to form nanosensor (3) which provide information regarding a physical condition of a material (20), such as an airplane chassis or wing, in contact with the nanosensor (3).

39 Claims, 7 Drawing Sheets

U.S. PATENT DOCUMENTS

| | | | |
|---|---|---|---|
| 5,659,248 | A | 8/1997 | Hedengren et al. |
| 5,966,011 | A | 10/1999 | Goldfine et al. |
| 6,258,401 | B1 | 7/2001 | Crowley |
| 6,276,214 | B1* | 8/2001 | Kimura et al. ............... 73/795 |
| 6,414,483 | B1 | 7/2002 | Nath et al. |
| 6,437,329 | B1 | 8/2002 | Yedur et al. |
| 6,591,658 | B1 | 7/2003 | Yedur et al. |
| 2002/0167375 | A1 | 11/2002 | Hoppe et al. |
| 2002/0192441 | A1* | 12/2002 | Kalkan et al. ............... 428/209 |
| 2003/0165418 | A1 | 9/2003 | Ajayan et al. |
| 2003/0184235 | A1 | 10/2003 | Watanabe et al. |
| 2003/0189235 | A1 | 10/2003 | Watanabe et al. |
| 2003/0218224 | A1* | 11/2003 | Schlaf et al. ............... 257/414 |
| 2004/0005736 | A1* | 1/2004 | Searls et al. ............... 438/122 |
| 2004/0070006 | A1* | 4/2004 | Monty et al. ............... 257/200 |

OTHER PUBLICATIONS

K. Lau and D. Hui. "The revolutionary creation of new advanced material—carbon nanotube composites." Composites: Part B. 33. 263-277. (2002).*

Andrews et al., "Continuous production of aligned carbon nanotubes: a step closer to commercial realization," Chem. Phys. Lett., Apr. 16, 1999, 303, 467-474.

Baughman et al., "Carbon Nanotube Actuators," Science, May 21, 1999, 284, 1340-1344.

Bonard et al., "Tuning the Field Emission Properties of Patterned Carbon Nanotube Films," Adv. Mater., Feb. 5, 2001, 13(3), 184-188.

Calvert, P., "A recipe for strength," Nature, May 20, 1999, 399, 210-211.

Curran et al., "A Composite from Poly(m-phenylenevinylene-co-2,5-dioctoxy-p-phenylenevinylene) and Carbon Nanotubes: A Novel Material for Molecular Optoelectronisc," Adv. Mater., 1998, 10(14), 1091-1093.

DeHeer et al., "A Carbon Nanotube Field-Emission Electron Source," Science, Nov. 17, 1995, 270, 1179-1180.

Fournet et al., "Enhanced brightness in organic light-emitting diodes using a carbon nanotube composite as an electron-transport layer," J. Appl. Phys., Jul. 15, 2001, 90(2), 969-975.

Haggenmueller et al., "Aligned single-wall carbon nanotubes in composites by melt processing methods," Chem. Phys. Lett., Nov. 10, 2000, 330, 219-225.

Homma et al., "Growth of suspended carbon nanotube networks on 100-nm-scale silicon pillars," Appl. Phys. Lett., Sep. 16, 2002, 81(12), 2261-2263.

Hu et al., "Growth of well-aligned carbon nanotube arrays on silicon substrates using porous alumina film as a nanotemplate," Appl. Phys. Lett., Nov. 5, 2001, 79(19), 3083-3085.

Huang et al., "Controlled fabrication of aligned carbon nanotube patterns," Physica B., 2002, 323, 333-335.

Iijima, S., "Helical microtubules of graphitic carbon," Nature, Nov. 7, 1991, 354, 56-58.

Jeong et al., "Packing Density Control of Aligned Carbon Nanotubes," Chem. Mater., 2002, 14(10), 4003-4005.

Kind et al., "Patterned Films of Nanotubes Using Microcontact Printing of Catalysts," Adv. Mater., 1999, 11(15), 1285-1289.

Kong et al., "Nanotube Molecular Wires as Chemical Sensors," Science, 2000, 287, 622-625.

Lahiff, et al., "Selective Positioning and Density Control of Nanotubes within a Polymer Thin Film," Nano Letters, 3(10), Sep. 13, 2003, 1333-1337.

Nerushev et al., "The temperature dependence of Fe-catalysed growth of carbon nanotubes on silicon substrates," Physica B, 2002, 323, 51-59.

O'Connell et al., "Band Gap Fluorescnece from Individual Single-Walled Carbon Nanotubes," Science, Jul. 26, 2002, 297, 593-596.

Odom et al., "Atomic structure and electronic properties of single-walled carbon nanotubes," Nature, Jan. 1, 1998, 391, 62-64.

Rosenblatt et al., "High Performance Electrolyte Gated Carbon Nanotube Transistors," Nano Lett., 2002, 2(8), 869-872.

Saito et al., "Probing Phonon Dispersion Relations of Graphite by Double Resonance Raman Scattering," Phys. Rev. Lett., Jan. 14, 2002, 88(2), 027401, 4 pages.

Satishkumar et al., "Bundles of aligned carbon nanotubes obtained by the pyrolysis of ferrocene-hydrocarbon mixtures: role of the metal nanoparticles produced in situ," Chem. Phys. Lett., Jul. 2, 1999, 307, 158-162.

Tan et al., "Probing the phonon dispersion relations of graphite from the double-resonance process of Stokes and anti-Stokes Raman scatterings in multiwalled carbon nanotubes," Phys. Rev. B, 2002, 66, 245410,8 pages.

Tans et al., "Room-temperature transistor based on a single carbon nanotube," Nature, May 7, 1998, 393, 49-52.

Tans et al., "Individual single-wall carbon nanotubes as quantum wires," Nature, Apr. 3, 1997, 386, 474-477.

Thomsen et al., "Double Resonant Raman Scattering in Graphite," Phys. Rev. Lett., Dec. 11, 2000, 85(24), 5214-5217.

Treacy et al., "Exceptionally high Young's modulus observed for individual carbon nanotubes," Nature, Jun. 20, 1996, 381, 678-680.

Wei et al., "Organized assembly of carbon nanotubes," Nature, Apr. 4, 2002, 416, 495-496.

Wildöer et al., "Electronic structure of atomically resolved carbon nanotubes," Nature, Jan. 1, 1998, 391, 59-62.

Xia et al., "Soft lithography," Angew. Chem., Int. Ed., 1998, 37, 550-575.

* cited by examiner

EMBEDDED NANOTUBE ARRAY SENSOR AND METHOD OF MAKING A NANOTUBE POLYMER COMPOSITE

CROSS-REFERENCE TO RELATED APPLICATIONS

This application claims priority to U.S. Provisional Application Ser. No. 60/431,834, filed Dec. 9, 2002, the disclosure of which is incorporated by reference herein in its entirety.

STATEMENT REGARDING FEDERALLY SPONSORED RESEARCH OR DEVELOPMENT

This invention was made with government support under NSF Contract No. DMR-0117792. The government has certain rights in the invention.

FIELD OF THE INVENTION

The present invention is generally directed to carbon nanotube devices and methods of making thereof and specifically to carbon nanotube sensors.

BACKGROUND OF THE INVENTION

Polymer matrix composites are used in a variety of structural applications in the aerospace industry for numerous reasons including overall weight savings and improved stability and durability. Breakthroughs in nanotechnology, more specifically, nanocomposites have significantly reduced weight and cost of these materials while enhancing other features beneficial to both military and commercial aircraft. Routine nondestructive inspections take place at periodic intervals to ensure safety of flight. These mandated inspections focus on damage caused by impact, flight induced stress or manufacturing defect. Currently, most of these inspections are time consuming, expensive and result in significant down time of the aircraft.

SUMMARY OF THE INVENTION

One embodiment of the invention relates to a sensor system. The system comprises a nanosensor containing at least one conductive channel comprising an array of substantially aligned carbon nanotubes or carbon nanofibers embedded in a matrix material. The system also comprises a first electrode electrically contacting the carbon nanotubes or carbon nanofibers on a first portion of the at least one conductive channel and a second electrode electrically contacting carbon nanotubes or carbon nanofibers on a second portion of the at least one conductive channel.

Another embodiment of the invention relates to a method of making a carbon nanotube composite material. The method comprises providing an array of carbon nanotubes on a first surface of a substrate, wherein the carbon nanotubes in the array are located in a predetermined pattern. The method further comprises depositing a flowable material comprising at least one of polymer, monomer or oligomer between the carbon nanotubes of the array and curing the flowable material after the step of depositing to form a flexible matrix film containing a controlled carbon nanotube morphology. The method further comprises peeling off the matrix film containing the carbon nanotubes from the substrate.

BRIEF DESCRIPTION OF THE DRAWINGS

FIGS. 5A-F are FESEM images of polymer micropatterned substrates for nanotube growth according to an embodiment of the present invention. In FIGS. 5A, 5B and 5C, the darker areas correspond to regions of high organometallic polymer concentration and paler areas represent the silicon oxide substrate. FIGS. 5D and 5E show that after CVD using acetylene, the carbon nanotube growth occurred only on the micropatterned areas of the substrate (i.e., the areas covered with the catalyst template). A close-up image of one of the micropatterned areas in FIG. 5E is shown in FIG. 5F.

FIGS. 6A and 6B illustrate the dependence of nanotube growth density on feature height of the polymer catalyst micropatterns. Patterns shown in FIG. 6A and 6B, respectively, were made using 1 and 2 weight percent solution, respectively, of an iron-containing polymer catalyst. CVD conditions were identical for both samples. Magnification is of the same order for all larger FESEM images. The smaller insets show a portion of the image at higher resolution.

DETAILED DESCRIPTION OF THE PREFERRED EMBODIMENTS

Figure 1:
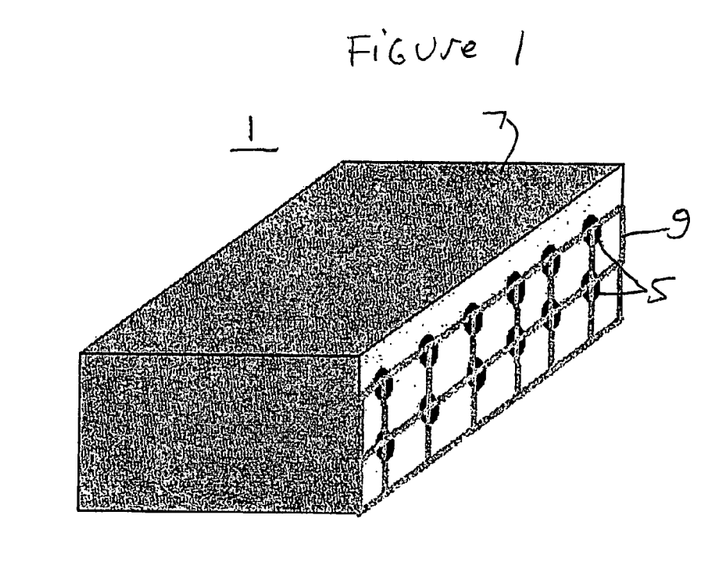
FIGS. 1 and 2 are three dimensional views of a sensor system according to an embodiment of the present invention.
Figure 2:
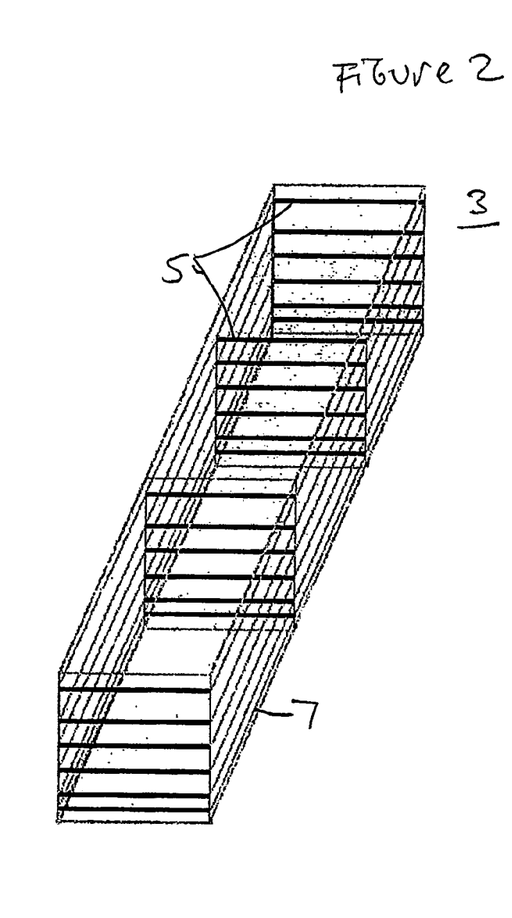

A sensor system 1 of the first embodiment of the present invention is shown in FIG. 1. The sensor system 1 includes a nanosensor 3 shown in FIGS. 1 and 2. The nanosensor comprises at least one conductive channel and preferably a plurality of conductive channels 5. Each conductive channel 5 comprises an array of substantially aligned carbon nanotubes or carbon nanofibers embedded in a matrix material 7. The term carbon nanotubes includes multiwalled and singlewalled carbon nanotubes. Preferably, the carbon nanotubes have diameters less than 1 micron and lengths greater than 1 micron. The term nanofibers includes carbon fibers other than nanotubes having a diameter less than 100 nm and which can carry current and/or be affected by changes in thermal environments.

In other words, a plurality of conductive nanotubes or nanofibers that are arranged close together in a shape of a channel in the matrix material 7 form the conductive channels 5. While the channels 5 are preferably linear in shape, they may have any other suitable shape, such as a curve, polygon, circle, spiral, oval or other regular or irregular geometric shape. The height of the channels 5 is preferably the same as the length of the nanotubes or nanofibers. The channels may have any suitable length and width, such as a length of 100 microns to 100 centimeters, such as 1 to 10 centimeters, and a width of 100 nanometers to 1 centimeter, such as 5 to 50 microns.

The channels 5 are separated from each other by regions of the non-conductive matrix material 7 which contain few or no conductive nanotubes or nanofibers. The matrix material 7 preferably comprises a flexible polymer film having two opposing major surfaces and a plurality of edge surfaces.

The system 1 also contains a first electrode 9 electrically contacting the carbon nanotubes or carbon nanofibers on a first portion of the at least one conductive channel 5 and a second electrode (not shown in FIG. 1 for clarity) electrically contacting carbon nanotubes or carbon nanofibers on a second portion of the at least one conductive channel. Preferably, the first 9 and second electrodes may contact opposite edge surfaces of the matrix material 7 as a network of contacts to the conductive channels 5, as shown in FIG. 1. However, if the conductive channels 5 are exposed through or are located in sufficient proximity to one of the major surfaces of the matrix film 7, then one or both electrodes may contact the conductive channels on one or both major surfaces of the matrix film.

Any suitable electrodes may be used, such as Schottky contacts, pn junction diode contacts, metallic ohmic contacts (such as gold or copper contacts), conductive organic contacts, such as conductive polymer contacts, and semiconductor contacts, such as doped polysilicon contacts. The electrodes may have any suitable shape, such as bulk chip structures (i.e., junction diodes, etc.), thin films and wires having dimensions that are sufficiently small to contact the carbon nanotubes or carbon nanofibers in the conductive channels 5.

Figure 5A:
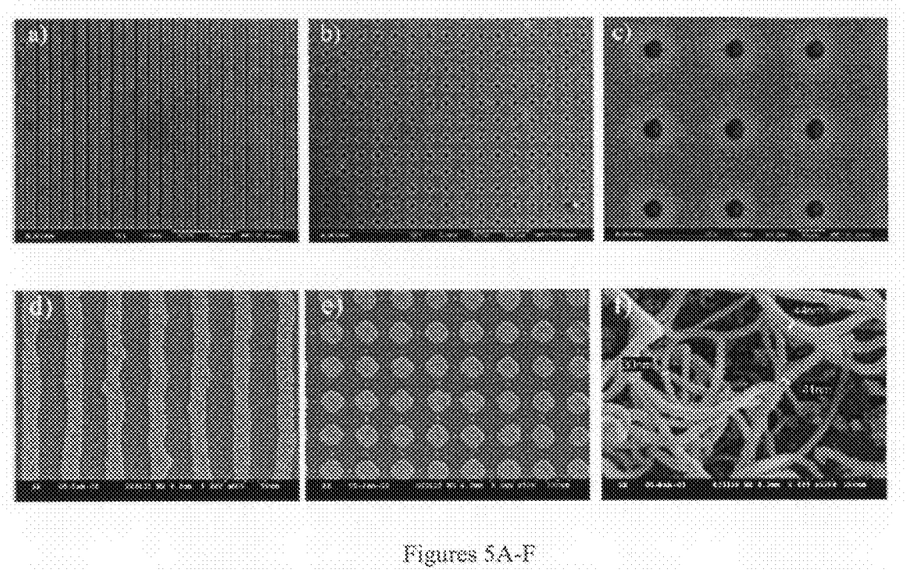
Figure 6A:
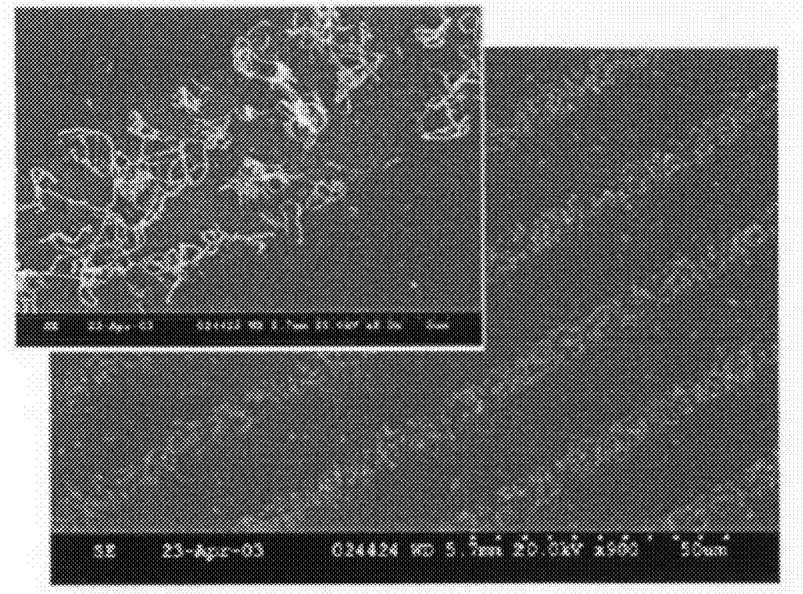
FIGS. 6A and 6B are FESEM images of nanotube patterns according to an embodiment of the present invention.
Figure 6B:
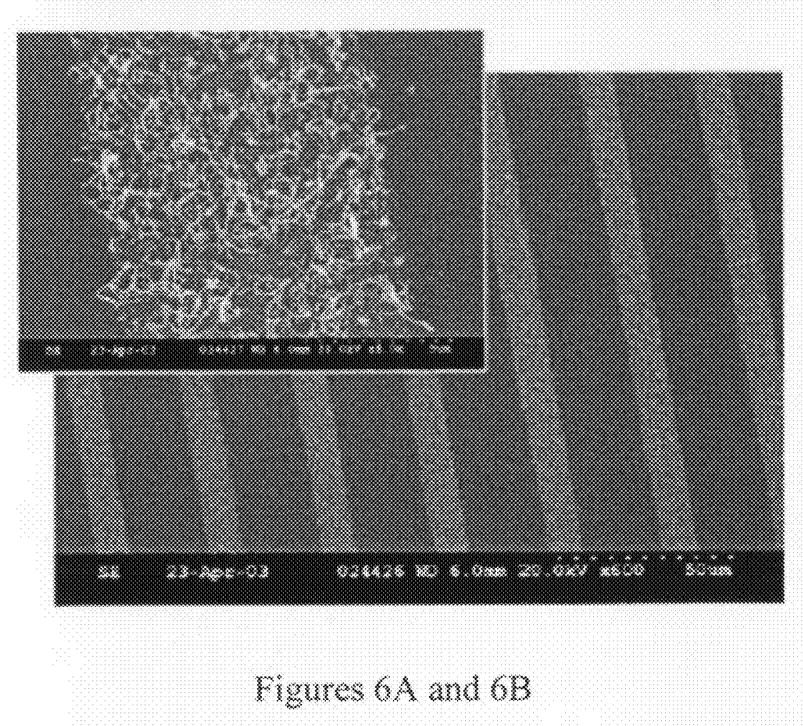

The nanosensor 3 may have any suitable configuration. For example, in a first nanosensor configuration shown in FIGS. 3A and 3B, the nanosensor comprises a polymer matrix film 7 containing the carbon nanotubes or carbon nanofibers 11 arranged in conductive channels 5. FIG. 3B is a cross sectional view of FIG. 3A along line A-A. The carbon nanotubes or carbon nanofibers 11 generally extend in a direction parallel to a thickness direction of the polymer matrix film 7. The term "generally extend" means that the nanotubes or nanofibers may be bent in various directions rather than being located straight up in the thickness direction of the film, as shown in FIGS. 5F, 6A and 6B, which are described in more detail below.

Figure 3A:
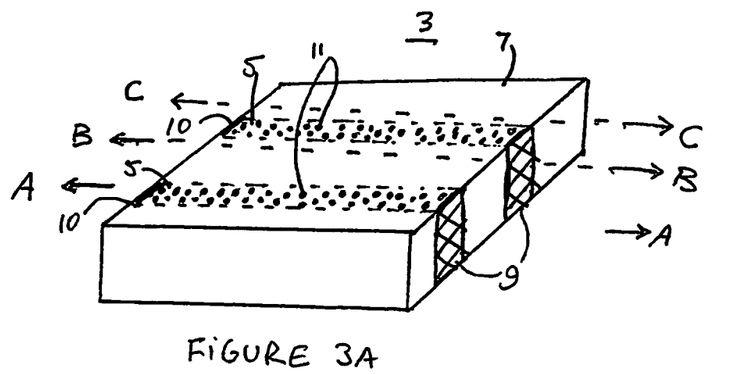
FIGS. 3A and 3C are three dimensional views of nanosensors according to an embodiment of the present invention.
Figure 3B:
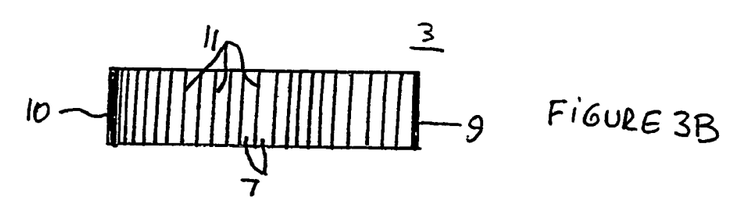
FIG. 3B is a cross sectional view along line A-A in FIG. 3A.
Figure 3C:
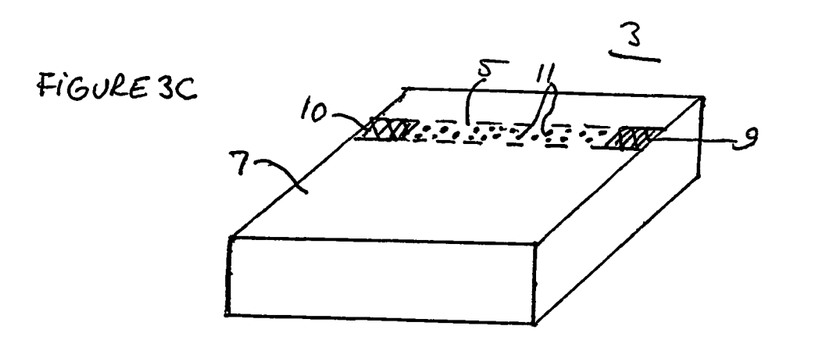

Furthermore, in the first nanosensor 3 configuration shown in FIG. 3A, the carbon nanotubes or carbon nanofibers 11 are substantially aligned in the plurality of conductive channels 5 extending in polymer matrix 7 film in a direction substantially perpendicular to the thickness direction of the polymer matrix film. The term "substantially aligned" means that at least 70%, preferably at least 90% of the nanotubes or nanofibers 11 in the nanosensor 3 are located in the conductive channels 5, as shown in FIG. 7B, which is described in more detail below. As discussed above, the electrodes 9 and 10 may contact the conductive channels on edges of the matrix film 7, as shown in FIG. 3A and/or on one or both major faces of the matrix film 7, as shown in FIG. 3C.

Figure 3D:
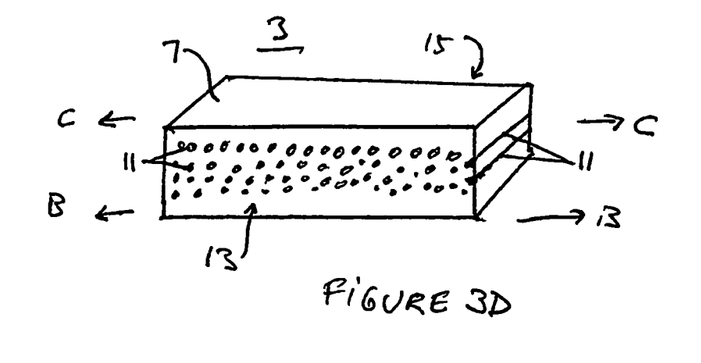
FIG. 3D is a three dimensional view of a cut out along lines B-B and C-C in FIG. 3A.

In a second nanosensor configuration shown in FIG. 3D, the nanosensor 3 comprises a polymer matrix 7 containing the carbon nanotubes or carbon nanofibers 11. The conductive channels 5 comprise the carbon nanotubes or carbon nanofibers extending length wise through the polymer matrix 7 such that opposing ends of the carbon nanotubes or carbon nanofibers 11 are exposed in opposing faces of the polymer matrix 7. In this configuration, the polymer matrix 7 comprises a narrow strip that has a width that is the same or less than a length of the nanotubes or nanofibers, such as 10 microns or less. The conductive channels 5 comprise one or more individual nanotubes or nanofibers 11 which extend through the entire length of the polymer matrix 7 and whose ends are exposed on opposing faces of the matrix 7. This nanosensor configuration may be used for measuring physical properties of microdevices or small regions in a larger device or product. The sensor 3 configuration shown in FIG. 3D may be formed by cutting a strip indicated by dashed lines B-B and C-C in FIG. 3A and rotating the strip 90 degrees before or after forming the electrodes 9 and 10 on faces 13 and 15 of the strip. Furthermore, for the configuration of FIG. 3D, the nanotubes or nanofibers may be selectively grown on circular or other polygonal templates, such as the template shown in FIGS. 5B and 5E rather than being grown on a linear template shown in FIGS. 5A and 5D.

The nanosensor 3 is adapted to provide information relating to a physical condition of any suitable first material in contact with the nanosensor 3. Preferably, the information may comprise real time information relating to a physical condition of the material.

Preferably, the information is generated based on variations of current flowing through the nanosensor 3 between the first 9 and second 10 electrodes. The current flowing through the nanosensor 3 between the first and second electrodes varies due to any suitable action imposed on the nanotubes or nanofibers by the physical conditions of the material in contact with the nanosensor and/or of the nanosensor itself. The actions include but are not limited to bending, twisting, breaking, static build up and thermal induced changes of the carbon nanotubes or carbon nanofibers generated by the physical conditions which include thermal effects, stress, strain, static build up, cracking, fracture and breakage of the material and/or the nanosensor.

Figure 4:
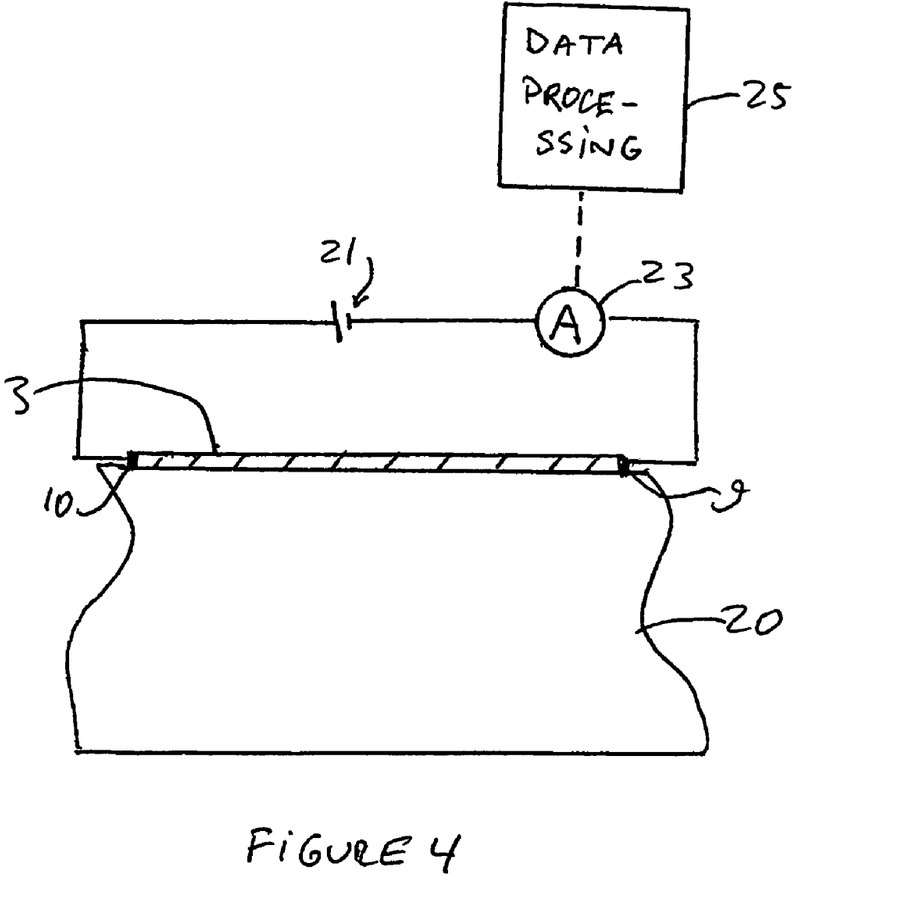
FIG. 4 is a circuit schematic of a sensor system according to an embodiment of the present invention.

FIG. 4 illustrates a circuit schematic of one embodiment of the sensor system 1. The nanosensor 3 may be removably placed into contact with the material being monitored 20 or permanently incorporated into or attached onto the material 20. The system 1 includes a power supply 21 adapted to provide a current through the nanosensor 3 between the first 9 and second 10 electrodes. Preferably the power supply comprises a voltage source. The voltage source may comprise an AC, DC or battery type constant voltage source. Alternatively but less preferably, the power supply 21 may comprise a current source which provides a constant current between the electrodes. In this case, a variable voltage across the nanosensor 3 rather than a variable current or conductance (i.e., resistance) of the nanosensor 3 is measured.

The system 1 further includes a detector 23 adapted to detect variations in conductivity of the carbon nanotubes or carbon nanofibers by detecting the variations in the current through the nanosensor 3 between the first 9 and second 10 electrodes. Preferably, the detector comprises an ammeter or other suitable current detector. The detector 23 may be a stand alone device or integrated with the power supply 21.

The system 1 also contains a data processing device 25, such as a general or special purpose computer or a microprocessor. Preferably the device 25 is a computer which runs a data analysis software which converts detected current variation data into values of physical condition of the material being monitored. The software may for example compare the received data to stored data from standard samples to determine the physical condition of the material. The data processing device 25 may be separated from the power supply and detector or they may be integrated into a single device. The device 25 is adapted to determine at least one of thermal effects, stress, strain, static build up, crack content, fracture content, and breakage content of the first material in real time based on the variations in conductivity detected by the detector 23. The detector 23 may provide information to the device 25 through a wire or wireless (i.e., radio frequency or optical) communication channels. Any other suitable sensor system circuit and components may be used instead.

The sensor system 1 is preferably used to determine a real time physical condition of a material, such as monitoring the physical condition of an airplane wing or chassis while the airplane is in flight. The monitoring method includes providing at least one nanosensor 3 incorporated into or in contact with the material, receiving real time information from the at least one nanosensor 3, and determining a real time physical condition of the material. The step of receiving real time information from the nanosensor(s) 3 comprises continuously detecting variations in current flowing through the nanosensor(s) 3 between the electrodes 9, 10.

The information gathered by the detector 23 that is passed to the data processing device or computer 25 may include information regarding stress, strain, fracture content, breaking and/or cracking (i.e., flaw or defects in the material being monitored) which is calculated by the device 25 from the changes in the conductivity. The device 25 may also calculate the thermal effects on the material and determine the static build-up for different environments from changes in electrical conductivity detected near the surface of the material.

Alternatively, the sensor system 1 may also be used to determine a non-real time physical condition of a material. For example, the sensor system 1 may be used to determine a physical condition of parts after manufacture to determine the content of minor defects, such as crack content, which may be fixed, or major defects, such as fracture and breakage content, which cause the parts to be scrapped. In this case, the data from each part is compared to data from a standard part with no defects to ascertain the presence of defects. Furthermore, in this case, the nanosensor 3 is preferably removed from the part after the physical condition of the part is determined.

Optionally, the method may also include a step of analyzing the information received by the data processing device 25 from the at least one nanosensor 3. The step of analyzing may include providing data representative of a change in at least one of thermal and electrical conductivity of the at least one nanosensor, determining whether the change is due to shifts of the nanosensors or actual fractures by comparing the change to previously stored data, incrementing a point in a relevant stress, strain, thermal, DC and AC position as a reference data-point is compared against it, and placing the data into a grid pattern for mathematical analysis and go/no go options. If desired, a sample signal received from the at least one sensor may be analyzed and compared with a reference signal for databasing, in-flight recording and safety analysis.

Optionally, the method may also include normalizing the collected and stored thermal and electrical conductivity data, comparing the normalized collected and stored thermal and electrical conductivity data, and rejecting the thermal and electrical conductivity data if the difference in the comparing step exceeds a predetermined amount.

The method may also include determining if the values of the physical conditions are within acceptable tolerance and at least one of signaling or displaying an alarm if at least one value of the physical conditions are outside acceptable tolerance. Preferably, the determined values of the physical conditions of the material are displayed visually, such as on a display screen or printed on paper, or displayed audibly, such as spoken by a computer simulated voice. The values are also preferably stored as data in the data processing device 25, such as a computer, or on a computer readable medium, such as a CD or disk. The real time physical condition of the material in an airplane or other vehicle may be provided in real time to a flight crew and wirelessly to a ground crew of the aircraft.

Embedding nanosensors comprising a polymer matrix composites for critical structural airframe components enables higher yield manufacturing processes through immediate feedback on process-induced flaws and also enables a real time in-flight monitoring of critical components. This information can be integrated over time to better predict life expectancy and provide valuable information for improvements to structural component designers and manufacturers.

The detection and discrimination of potentially dangerous structural information from the chassis and other parts of the aircraft can be optimally determinable at the location where such distortions and defects appear, that information being made readily available. For example, the nanosensor 3 allows one to identify cracks within the airframe without having to use time consuming and expensive optical or acoustic testing instruments on the ground. Having the necessary information would allow the aircrew to be able to determine the worthiness of the aircraft for flight, take precautionary measures if the damage is serious without endangering life or risking the destruction of the aircraft. To do so effectively, the sensor system 1 provides this information onboard as the risk or damage occurs. In most instances, catching the first defects will prevent the need for later heavy maintenance. It also allows aircraft maintenance crews the chance to quickly identify the location of the damage without having to waste time using bulky and expensive equipment.

The method of using the sensor system 1 allows inspection and detection of flaws in critical to safety/airworthiness aircraft polymer composite structures. The nanosensors 3 efficiently obtain structural information on the aircraft while in-flight. This provides an aircraft having a greater working life as well as lowering the downtime for maintenance. The sensor system 3 also enhances the structural security of the aircraft for safety reasons. The flaw detection method does not require an overhaul of the entire aircraft. The aircraft can then be allowed to stay in the air for longer periods if there is no structural damage done to the aircraft. The detection method may also provide defect detection in an aircraft on the micro level (i.e., micro defect detection) with nanoscale tolerances while the aircraft is in flight or by the ground crew for more vigorous testing. The onboard computer (such as the data processing device 25) for data basing can give a history of structural effects for the entire flight of the aircraft. This information will give aircraft manufacturers greater information on the exact stresses and tolerances required by their aircraft during flight conditions. It would also allow the development of highly specialized aircraft specifically designed for extreme conditions, or for that matter for aircraft in more temperate climates.

The information is passed from the nanosensors 3 onto the electrodes or nanocontacts 9, 10, which then pass information to an onboard data base system, such as the in-flight computer (i.e., data processing device 25). Electronic interconnects preferably connect the electrodes 9, 10 of the nanosensor 3 on the airframe to the device 25. The data base system or software in the device 25 performs in-flight, routine testing algorithms to pass on critical information to the flight crew and/or the maintenance crew. This whole process can be carried on throughout the lifetime of the aircraft, giving a history of the conditions the flight experienced as well as structural information on the composition of the materials used in constructing the aircraft. This data-base routing allows flight crews to react to in-flight potential hazards before conditions in the aircraft become too risky. The benefit of having such information is reducing the risk to life, decreased down time for periodic maintenance and potential extension of the lifespan of an aircraft.

While the nanosensors 3 are preferably located on or in an airplane, such as an airplane chassis, wings, or other parts, such as engine blades and airplane cabin, the nanosensors 3 may be used to determine a physical condition of a material in any other device or structure, such as a building, industrial machinery or a movable vehicle. Non-limiting examples of industrial machinery include motors, generators, turbines and other power generation equipment. Non-limiting examples of movable vehicles include cars, trucks, buses, boats, trains, space vehicles (i.e., manned space vehicles), satellites and rockets (i.e., unmanned space vehicles) and missiles. For example, it is important to be able to determine stress and failure in missiles. The nanosensors can also be used for space vehicles, such as rockets and space ships. The continuous information gathering ability will make space travel safer and more efficient.

Preferably, the nanosensor 3 is flexible and shaped as a thin film or sheet due to the flexible polymer matrix and adapted to be removable from the material that it contacts for repair and/or replacement of the nanosensor and/or the material. Preferably, the nanosensor(s) are formed as a thin sheet or smart skin which coats the whole or a portion of the inner or outer surface of a body of a movable vehicle (such as an airplane), building or industrial machinery. If desired, the nanosensor may be adapted to act as at least one of an anti-static coating, a thermal conductor, an antenna and a structural reinforcing material due to the properties of the nanotube/polymer composite which makes up the nanosensor.

The composite comprising nanotube or nanofiber conductive channels in a polymer or other insulating matrix may be used as an antenna due to the electrical conductivity of the nanotubes or nanofibers, which allow the nanotube or nanofiber conductive channels to wirelessly receive and/or transmit information. The antenna further includes send and/or a receive circuit electrically connected to the carbon nanotubes or carbon nanofibers. For example, standard or custom made send/receive circuits may be used to provide a radio frequency signal emitted by the antenna and/or to decode a radio frequency signal received by the antenna. The send/receive circuit may be powered by a battery, by an AC or DC power source and/or by the RF signal received by the antenna, similar to an RFID tag. It should be noted that only one electrode may be used when the polymer composite is used as an antenna rather than as a sensor.

The composite antenna may be coated as a sheet or smart skin on the whole or part of a surface of a movable vehicle, such as an airplane, rocket, spaceship or missile, such that the whole or part of the movable vehicle body becomes an antenna. This may be used to replace or augment traditional antennas, radar systems, fly by wire systems and other hardware on the movable vehicle to decrease the weight of the movable vehicle. The antenna may also be used to receive and send signals from other sources. These composite materials can also be the basic architecture for stealth materials.

In a second embodiment of the invention, the nanotube (or nanofiber) polymer composite material is produced by a peel apart method. While this method may be used to form the composite nanosensor 3 or antenna described above, it can also be used to form other nanotube/polymer composite devices, such as flat panel displays (i.e., plasma displays where the nanotubes arranged in predetermined positions are used as field emission electrodes), electronic devices, quantum wires, composite structural material and actuators. A peel apart method of forming the composite material is described, for example, in Emer Lahiff, et al., Nano Letters, vol. 3, no. 10 (Sep. 13, 2003) 1333-1337, incorporated herein by reference in its entirety.

The method of malting a carbon nanotube composite material according to the second embodiment includes providing an array of carbon nanotubes on a first surface of a substrate, where the carbon nanotubes in the array are located in a predetermined pattern, depositing a flowable material comprising at least one of polymer, monomer or oligomer between the carbon nanotubes of the array, curing the flowable material after the step of depositing to form a flexible matrix film containing a controlled carbon nanotube morphology, and peeling off the matrix film containing the carbon nanotubes from the substrate. While the method of the second embodiment is preferably conducted with nanotubes, it may also be extended to nanofibers if desired.

In one aspect of the second embodiment, the controlled carbon nanotube morphology comprises carbon nanotubes 11 which generally extend in a direction parallel to a thickness direction of the matrix film 7, and carbon nanotubes which are substantially aligned in a plurality of conductive channels 5 extending in the matrix film in a direction substantially perpendicular to the thickness direction of the matrix film 7. However, other controlled morphologies for other applications are also possible.

Preferably, the step of providing an array of carbon nanotubes comprises providing a growth template pattern on the first surface of the substrate, and selectively growing the carbon nanotubes on the growth template pattern. The step of providing the growth template pattern preferably comprises depositing a catalyst pattern by stamping the first surface of the substrate with a patterned stamp coated with the catalyst. The step of selectively growing the carbon nanotubes comprises selectively growing the carbon nanotubes on the catalyst pattern by CVD. The density of the carbon nanotubes selectively grown on the catalyst pattern may be controlled by controlling a thickness of the catalyst pattern. If it is desired to form the nanosensor 3 of the first embodiment, then electrodes 9, 10 are formed in electrical contact with the carbon nanotubes in the matrix film to form a nanosensor.

Preferably, the method of the second embodiment is a controlled, efficient and cost effective method of producing carbon nanotube arrays within a polymer matrix. Carbon nanotubes are grown by chemical vapor deposition (CVD) on a pre-patterned template. Preferably, the template for carbon nanotube growth is an organometallic polymer catalyst formed by soft lithography patterning (i.e., stamping a substrate with a catalyst coated stamp). Soft lithography can be used to rapidly pattern large areas under atmospheric conditions. The shape and dimensions of the molded elastomer stamp used to create the patterns can be modified to create a variety of templates for nanotube growth. Using the elastomer stamp, the organometallic polymer catalyst is patterned onto a substrate, such as a silicon oxide substrate, as shown in FIGS. 5A-C. It should be noted that substrates other than the silicon oxide substrate may be used. The substrate may contain one or more layers formed prior to the soft lithography. The template micropattern feature sizes are dictated by the dimensions of the stamp. The height of the catalyst features can be controlled by varying the concentration of the polymer solution used to create the patterns.

The organometallic polymer preferably comprises a poly (styrene-vinylferrocene) copolymer blend (PS-PVF). This PS-PVF blend may be anionically synthesized. A combination of gel permeation chromatography and nuclear magnetic resonance revealed that the PS-PVF copolymer blend used to form the template patterns shown in FIGS. 5A-C contained 8% vinylferrocene. The vinylferrocene contains an iron core and is the part of the polymer that is active as a catalyst for carbon nanotube growth during CVD. Alternatively, a polyvinylferrocene (PVF) homopolymer catalyst or other suitable catalysts may be used. However, the PS-PVF copolymer is preferred to PVF homopolymer for reasons of dispersion. Nanotubes grown on patterned PVF homopolymer grow in clusters of islands. Growth is more homogeneous when the PVF homopolymer is co-polymerized with polystyrene, thus diluting its concentration.

CVD growth of the nanotubes is performed at elevated temperatures between 550° C. and 1100° C., such as 800° C., where iron particles are present. Nanotubes are grown using both acetylene and xylene as the carbon source.

FIGS. 5D-F are field emission scanning electron microscope (FESEM) images which show that nanotube growth is selective to the PS-PVF polymer patterned areas of the silicon oxide substrate. Without wishing to be bound to a particular theory, the present inventors believe that this is due to the presence of catalyst (Fe) particles within the confines of the micropattern and the absence of the catalyst particles elsewhere on the substrate.

The density of carbon nanotubes produced on the substrate is dependent on the thickness of the micropattern features, as shown in FIGS. 6A and 6B. The height of these features is easily controlled by altering the concentration of the PS-PVF polymer solution used to pattern the substrates. For lower concentrations of the PS-PVF solution (1 wt %) shown in FIG. 6A the nanotube growth is quite sparse. For higher PS-PVF concentrations (2 wt %) shown in FIG. 6B, increased tube growth and density occurs. For concentrations of 5 wt % and above, complete coverage of the substrate between catalyst patterns is observed. Control over density of tube growth is important for applications such as field emission. If the nanotube density is too high, screening by neighboring emitter tips occurs. If the density is too low, amplification of the applied electric field is not sufficient.

Alternatively, the nanotube pattern may be formed by a selective deposition method described in U.S. published application US-2003-0165418-A1 filed as U.S. application Ser. No. 10/361,640 on Feb. 11, 2003, incorporated by reference in its entirety. In this alternative method, selective CVD nanotube growth can be stimulated by exposing a patterned template material on a substrate to vapor mixtures comprising xylenes ($C_8H_{10}$), a nanotube-forming precursor, and ferrocene ($Fe(C_5H_5)_2$), a nanotube catalyst, at about 600 to 1100° C., preferably at about 800 to 900° C. However, other suitable source gases and temperatures may be used instead. The template materials may comprise photolithographically patterned silicon dioxide, silicon oxynitride, magnesium oxide, aluminum oxide or indium tin oxide template materials on a substrate such as silicon. Ferrocene may be dissolved in xylenes (which preferably contains different isomers) at concentrations of about 0.01 g/ml, the mixture pre-heated, co-evaporated and fed into the CVD chamber. Ferrocene preferably comprises 0.001 to 1 percent of the ferrocene/xylenes mixture. Prolonged growth in the temperature range of 600-1100° C., selectively produces patterns of densely packed multiwalled carbon nanotubes on the template. The nanotubes films can be about 30 nm diameter multiwalled carbon nanotubes.

Figure 7A:
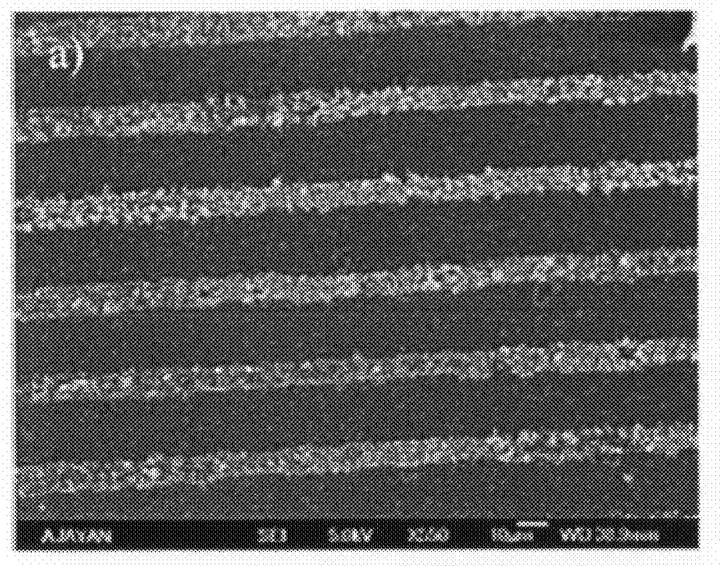
FIG. 7A is a FESEM image of controlled nanotube growth on a $SiO_2$ substrate and FIG. 7B is a FESEM image showing the nanotubes integrated into a PDMS polymer composite, according to an embodiment of the present invention.
Figure 7B:
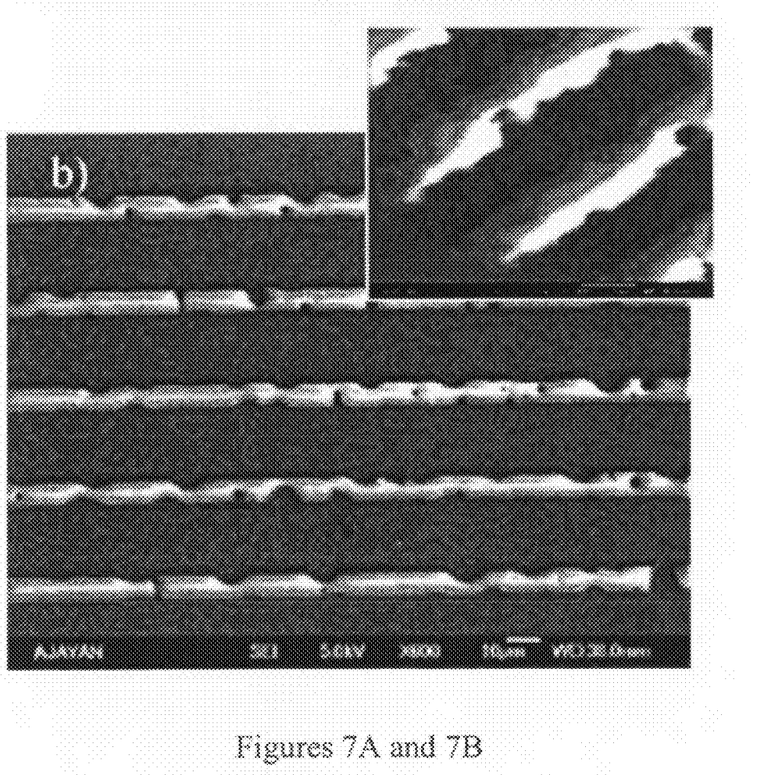

The as-grown nanotubes shown in FIG. 7A can then easily be incorporated into a polymer matrix as shown in FIG. 7B. Preferably, poly(dimethylsiloxane) polymer (PDMS) is used as a matrix material. However, other suitable polymer materials, such as polyesters, polyamides or polycarbonates may be used as a matrix instead. Furthermore, monomer and oligomer containing materials may also be used if these materials are polymerized to form a polymer matrix film prior to the peel apart step. A thin film of PDMS is spin coated onto the nanotube pattern or film, as shown in FIG. 7B. Bright areas in FIG. 7B correspond to conductive channels within the PDMS polymer, which, is represented by the darker regions in the FESEM image. For example, a mixture of base/curing agent (weight ratio of 10:1) from a Sylgard 184 elastomer kit is deposited onto the patterned arrays of as grown nanotubes. The polymer disperses into vacant areas in the nanotube array. The nanotube/polymer matrix is then cured for a suitable time, such as 24 hours at room temperature and under atmospheric conditions. The composite is then simply peeled off the substrate giving a free-standing flexible film containing a controlled nanotube morphology.

Thus, pre-patterning of the template on substrate on which the nanotubes are grown controls the position of the nanotubes within the composite. The density of nanotubes within the composite depends on the density of the as-grown nanotubes, which as discussed, can be controlled by varying the feature height of the polymer micropatterns used as a template for tube growth.

Figures 8A, 8B, 8C, 8D:
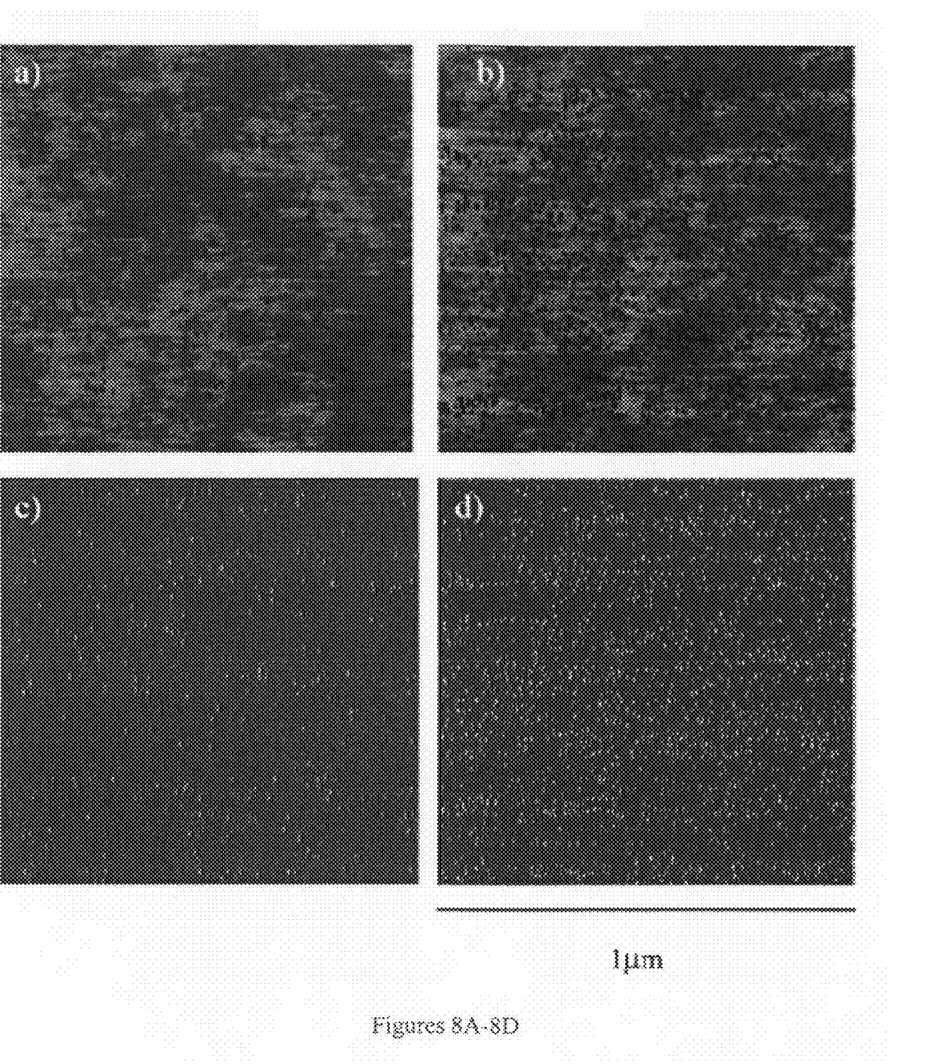
FIG. 8A is an AFM image of the PDMS area of the composite and FIG. 8B is an AFM image of the nanotube channels within the polymer composite, according to an embodiment of the present invention. Features are 0-10 nm. Scale bars for both images are 1 micron.
FIG. 8C is an EFM image of the PDMS area of the composite corresponding to FIG. 8A
FIG. 8D is an EFM image of the nanotube channels within the polymer composite corresponding to FIG. 8B, according to an embodiment of the present invention. Features are 0-300 mV. Scale bars for both images are 1 micron.

The nanotubes enhance the transport properties of a polymer. The presence of the conducting channels is verified by a combination of atomic and electron force microscopy (AFM/EFM). AFM images shown in FIGS. 8A and 8B show the height image data on a scale of 0-10 nm, and the corresponding EFM images (FIGS. 8C, 8D) show amplitude image data on a scale of 0-300 mV. Results shown in FIGS. 8A-D are recorded in tapping mode at a scan rate of 0.500 Hz. It is clear from these images that the height profile of the composite correlates with the position of the conduction channels. The uneven height of the composite surface is believed to be due to the nanotubes protruding from the PDMS surface (dark areas in FIGS. 8A and 8B). The 'dots' in the AFM images, which correspond to the nanotube positions, are in the region of 20 nm in diameter.

The position of the nanotubes observed in FIGS. 8A and 8B matches the location of the conduction paths (i.e., the conducting channels) through the composite in FIGS. 8C and 8D. These conduction paths were also observed as 'dots' in the EFM images. The diameter of the EFM dots was found to be 10 nm. The decrease in diameter is believed to be due to an increase in the resolution of the system using a sharper diamond tip cantilever for the EFM measurements. The diameter of the nanotubes used to make the composite was measured by FESEM to be in the region of 20-50 nm. Without wishing to be bound by a particular theory, the present inventors believe that this indicates that it is possibly only the very tips of the nanotubes that project from the PDMS surface.

Thus, a scalable inexpensive technique to fabricate flexible carbon nanotube composites is provided. The location and density of conducting channels 5 within the composite can be controlled by soft lithography patterning. The composite can then be used for applications that require conductive channels within a flexible matrix. The method also provides control over the position and density of nanotubes within the composite.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A sensor system, comprising:
a nanosensor comprising at least one conductive channel comprising an array of substantially aligned carbon nanotubes or carbon nanofibers embedded in a polymer matrix film;
a first electrode electrically contacting the carbon nanotubes or carbon nanofibers on a first portion of the at least one conductive channel;
a second electrode electrically contacting carbon nanotubes or carbon nanofibers on a second portion of the at least one conductive channel; and
wherein the carbon nanotubes or carbon nanofibers generally extend in a direction parallel to a thickness direction of the polymer matrix film; and
the carbon nanotubes or carbon nanofibers are substantially aligned in a plurality of conductive channels extending in the polymer matrix film in a direction substantially perpendicular to the thickness direction of the polymer matrix film.

2. The sensor system of claim 1, wherein:
the at least one conductive channel comprises the carbon nanotubes or carbon nanofibers extending length wise through the polymer matrix such that opposing ends of the carbon nanotubes or carbon nanofibers are exposed in opposing faces of the polymer matrix.

3. The sensor system of claim 1, wherein the nanosensor is adapted to provide information relating to a physical condition of a first material in contact with the nanosensor due to variations of a current flowing through the nanosensor between the first and second electrodes.

4. The sensor system of claim 3, wherein:
the current flowing through the nanosensor between the first and second electrodes varies due to at least one of bending, twisting, breaking, static accumulation, and thermal induced changes of the carbon nanotubes or carbon nanofibers; and
the information relating to a physical condition comprises at least one of thermal effects, stress, strain, static build up, crack content, fracture content, and breakage content of the first material.

5. The sensor system of claim 3, wherein the first material is located in at least one of a building, industrial machinery and a movable vehicle.

6. The sensor system of claim 3, wherein the nanosensor is flexible and adapted to be removable from the first material.

7. The sensor system of claim 3, wherein the nanosensor is further adapted to act as at least one of an anti-static coating, a thermal conductor, an antenna and a structural reinforcing material.

8. The sensor system of claim 1, further comprising:
a power supply adapted to provide a current through the nanosensor between the first and second electrodes;
a detector adapted to detect variations in conductivity of the carbon nanotubes or carbon nanofibers by detecting the variations in the current through the nanosensor between the first and second electrodes; and
a data processing device which is adapted to determine at least one of thermal effects, stress, strain, static build up, crack content, fracture content, and breakage content of a first material in contact with the nanosensor in real time based on the variations in conductivity detected by the detector.

9. The sensor system of claim 8, wherein:
the first material comprises at least one of aircraft wing and aircraft chassis material; and
data from the data processing device is provided to at least one of a flight crew and a ground crew of the aircraft.

10. The sensor system of claim 1, wherein:
the array of substantially aligned carbon nanotubes or carbon nanofibers comprises an array of selectively grown carbon nanotubes arranged in predetermined locations in the polymer matrix film; and
the carbon nanotubes have diameters less than 1 μm and lengths greater than 1 μm.

11. The sensor system of claim 1, wherein the first and second electrodes are selected from a group consisting of Schottky contacts, pn junction diode contacts, metallic ohmic contacts, conductive organic contacts and semiconductor contacts.

12. The sensor system of claim 11, wherein the first and second electrodes are selected from a group consisting of bulk chip structures, thin films and wires.

13. A movable vehicle, comprising:
a movable vehicle body;
at least one sensor system of claim 1 incorporated into or in contact with the vehicle body.

14. The movable vehicle of claim 13, further comprising a data processing device which is adapted to receive information from the at least one nanosensor and to determine a real time physical condition of the vehicle body.

15. The movable vehicle of claim 14, wherein:
the movable vehicle comprises an aircraft;
the aircraft comprises a plurality of the sensor systems;
the nanosensors of the respective sensor systems are incorporated into or are located in contact with at least one of a wing and a chassis of the aircraft; and
data from the data processing device is provided to at least one of a flight crew and a ground crew of the aircraft.

16. The movable vehicle of claim 14, wherein the movable vehicle is selected from at least one of a car, truck, bus, boat, train, space vehicle, satellite, rocket and missile.

17. A method of determining a physical condition of a material comprising:
(i) providing at least one nanosensor incorporated into or in contact with the material, the at least one nanosensor comprising at least one conductive channel comprising an array of substantially aligned carbon nanotubes or carbon nanofibers embedded in a polymer matrix film;
(ii) receiving information from the at least one nanosensor;
(iii) determining the physical condition of the material based on the information from the at least one nanosensor; and
(iv) applying a voltage to the at least nanosensor between a first electrode electrically contacting the carbon nanotubes or carbon nanofibers on a first portion of the at least one conductive channel and a second electrode electrically contacting the carbon nanotubes or carbon nanofibers on a second portion of the at least one conductive channel such that a current flows through the at least one nanosensor;
wherein:
the carbon nanotubes or carbon nanofibers generally extend in a direction parallel to a thickness direction of the polymer matrix film; and
the carbon nanotubes or carbon nanofibers are substantially aligned in a plurality of conductive channels extending in the polymer matrix film in a direction substantially perpendicular to the thickness direction of the polymer matrix film.

18. The method of claim 17, wherein the material comprises at least one of aircraft wing and aircraft chassis material.

19. The method of claim 18, further comprising analyzing a sample signal received from the at least one sensor and comparing it with a reference signal for databasing, in-flight recording and safety analysis.

20. The method of claim 18, further comprising providing the real time physical condition of the material to at least one of a flight crew and a ground crew of the aircraft.

21. The method of claim 17, wherein the polymer matrix film contains carbon nanotubes.

22. The method of claim 17, wherein the polymer matrix film contains carbon nanofibers.

23. A method of determining a physical condition of a material comprising:
(i) providing at least one nanosensor incorporated into or in contact with the material, the at least one nanosensor comprising at least one conductive channel comprising an array of substantially aligned carbon nanotubes or carbon nanofibers embedded in a polymer matrix film;
(ii) receiving information from the at least one nanosensor;
(iii) determining the physical condition of the material based on the information from the at least one nanosensor; and
(iv) applying a voltage to the at least nanosensor between a first electrode electrically contacting the carbon nanotubes or carbon nanofibers on a first portion of the at least one conductive channel and a second electrode electrically contacting the carbon nanotubes or carbon nanofibers on a second portion of the at least one conductive channel such that a current flows through the at least one nanosensor;
wherein:
the at least one conductive channel comprises the carbon nanotubes or carbon nanofibers extending length wise through the polymer matrix such that opposing ends of the carbon nanotubes or carbon nanofibers are exposed in opposing faces of the polymer matrix.

24. The method of claim 23, wherein:
the step of receiving information from the at least one nanosensor comprises receiving real time information by continuously detecting variations in the current flowing through the at least one nanosensor between the first and second electrodes; and
the step of determining the physical condition of the material comprises determining a real time physical condition of the material.

25. The method of claim 24, wherein:
the current flowing through the nanosensor between the first and second electrodes varies due to at least one of bending, twisting, breaking, static build up and thermal induced changes of the carbon nanotubes or carbon nanofibers; and
the step of determining a real time physical condition of the material comprises determining at least one of thermal effects, stress, strain, static build up, crack content, fracture content, and breakage content of the material from changes in conductivity of the nanosensor.

26. The method of claim 23, wherein the material comprises at least one of aircraft wing and aircraft chassis material.

27. The method of claim 26, further comprising analyzing a sample signal received from the at least one sensor and comparing it with a reference signal for databasing, in-flight recording and safety analysis.

28. The method of claim 26, further comprising providing the real time physical condition of the material to at least one of a flight crew and a ground crew of the aircraft.

29. The method of claim 23, wherein the polymer matrix film contains carbon nanotubes.

30. The method of claim 23, wherein the polymer matrix film contains carbon nanofibers.

31. A method of determining a physical condition of a material comprising:
(i) providing at least one nanosensor incorporated into or in contact with the material, the at least one nanosensor comprising at least one conductive channel comprising an array of substantially aligned carbon nanotubes or carbon nanofibers embedded in a polymer matrix film;
(ii) receiving information from the at least one nanosensor;
(iii) determining the physical condition of the material based on the information from the at least one nanosensor; and
(iv) applying a voltage to the at least nanosensor between a first electrode electrically contacting the carbon nanotubes or carbon nanofibers on a first portion of the at least one conductive channel and a second electrode electrically contacting the carbon nanotubes or carbon nanofibers on a second portion of the at least one conductive channel such that a current flows through the at least one nanosensor;
wherein:
the step of receiving information from the at least one nanosensor comprises receiving real time information by continuously detecting variations in the current flowing through the at least one nanosensor between the first and second electrodes; and
the step of determining the physical condition of the material comprises determining a real time physical condition of the material; and
wherein:
the current flowing through the nanosensor between the first and second electrodes varies due to at least one of bending, twisting, breaking, static build up and thermal induced changes of the carbon nanotubes or carbon nanofibers; and
the step of determining a real time physical condition of the material comprises determining at least one of thermal effects, stress, strain, static build up, crack content, fracture content, and breakage content of the material from changes in conductivity of the nanosensor;
(v) analyzing the information received from the at least one nanosensor, comprising:
a) providing data representative of a change in at least one of thermal and electric conductivity of the at least one nanosensor;
b) determining whether the change is due to shifts of the nanosensors or actual fractures by comparing the change to previously stored data;
c) incrementing a point in a relevant stress, strain, thermal, DC and AC position as a reference data-point is compared against it; and
d) placing the data into a grid pattern for mathematical analysis and go/no go options.

32. The method of claim 31, further comprising determining whether the values of the physical conditions are within acceptable tolerance and at least one of signaling or displaying an alarm if at least one value of the physical condition is outside acceptable tolerance.

33. The method of claim 32, further comprising the step of displaying the determined values of the physical conditions.

34. The method of claim 31, further comprising the following steps in relative order:
   a) normalizing a collected and stored thermal and electrical conductivity data;
   b) comparing the normalized collected and stored thermal and electrical conductivity data;
   c) rejecting the thermal and electrical conductivity data if the difference in the comparing step exceeds a predetermined amount.

35. The method of claim 31, wherein the material comprises at least one of aircraft wing and aircraft chassis material.

36. The method of claim 35, further comprising analyzing a sample signal received from the at least one sensor and comparing it with a reference signal for databasing, in-flight recording and safety analysis.

37. The method of claim 35, further comprising providing the real time physical condition of the material to at least one of a flight crew and a ground crew of the aircraft.

38. The method of claim 23, wherein the polymer matrix film contains carbon nanotubes.

39. The method of claim 31, wherein the polymer matrix film contains carbon nanofibers.

* * * * *

UNITED STATES PATENT AND TRADEMARK OFFICE
CERTIFICATE OF CORRECTION

PATENT NO. : 7,673,521 B2  Page 1 of 1
APPLICATION NO. : 10/537944
DATED : March 9, 2010
INVENTOR(S) : Pulickel Ajayan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 854 days.

Signed and Sealed this

Twenty-eighth Day of September, 2010

David J. Kappos
*Director of the United States Patent and Trademark Office*